May 22, 1928.
R. A. KOCHER
1,670,727
PROCESS AND APPARATUS FOR CONVERTING CARBOHYDRATES
Original Filed Feb. 5, 1920
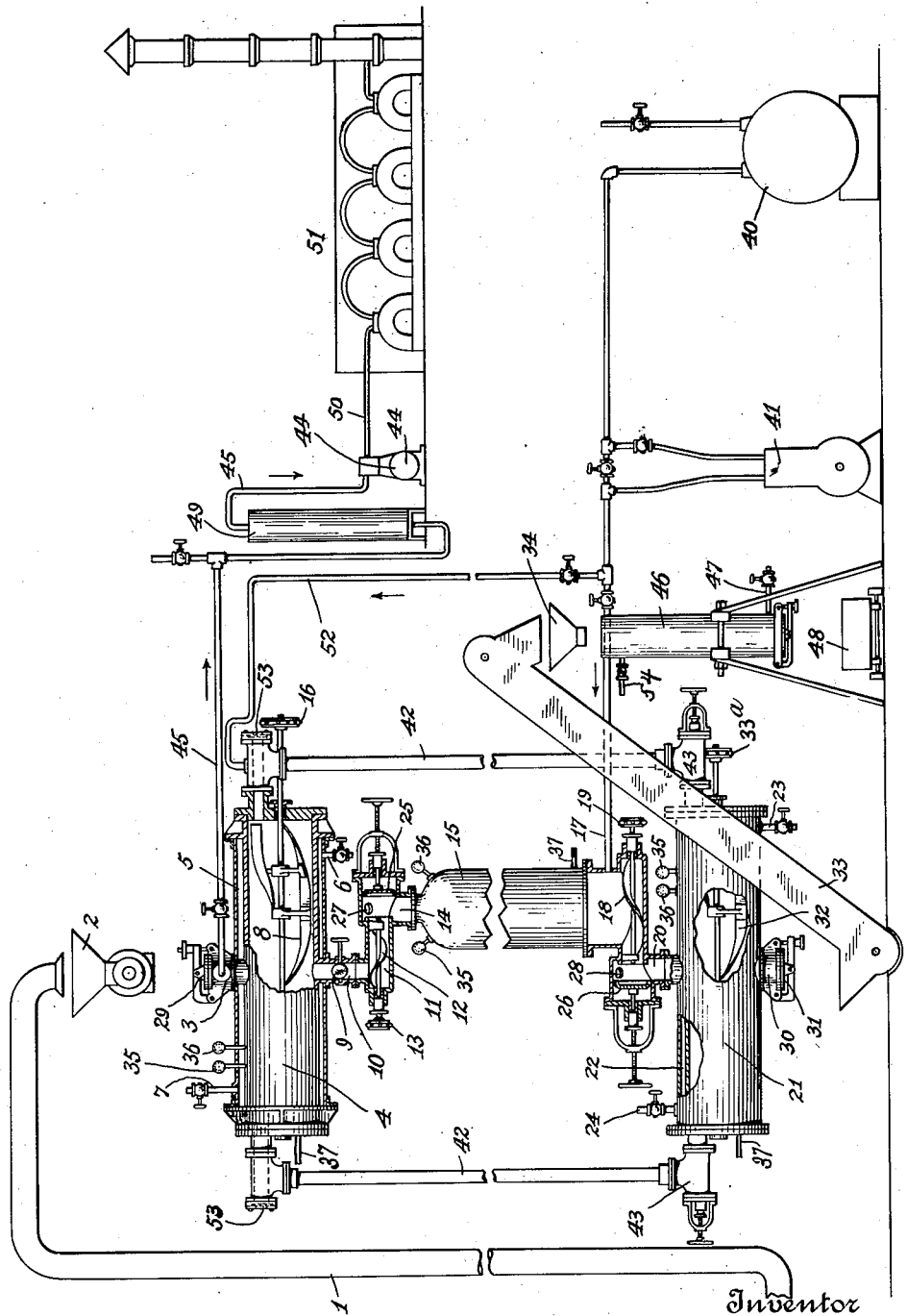
Inventor
Rudolph A. Kocher
By his Attorney
Gorham Crosby Patented May 22, 1928.

1,670,727

UNITED STATES PATENT OFFICE.

RUDOLPH ALFRED KOCHER, OF YPSILANTI, MICHIGAN.

PROCESS AND APPARATUS FOR CONVERTING CARBOHYDRATES.

Application filed February 5, 1920, Serial No. 356,450. Renewed March 21, 1925.

My invention relates to improvements in processes and apparatus for converting carbohydrates. My improvements are particularly advantageous in connection with the treatment of cellulose material such as sawdust and the like by means of acid such as hydrochloric acid to convert the same into sugar or sugars such as glucose or similar fermentable products which may be treated by fermentative methods for the production of alcohol, for example as described in my Patent No. 1,374,928 granted April 19, 1921. One object of my invention is to provide a method and apparatus in which such treatments may be most easily and economically carried out with the minimum amount of labor. Further objects, features and advantages will more clearly appear from the detailed description given below taken in connection with the accompanying drawing which illustrates an apparatus embodying my invention in a preferred form, the drawing being largely diagrammatic and certain parts being shown in section in order to more clearly illustrate the same. Since the invention is particularly adapted for use in the treatment of cellulose as above described, I will describe the details thereof in connection with such process.

The sawdust or other cellulose material to be treated is conveyed through any suitable conveyor 1 to a hopper 2 which by any suitable arrangement serves to feed the sawdust through a manhole 3 into a mixing container 4. The container 4 is cylindrical in shape and provided with an external jacket 5 for a temperature regulating fluid which may be introduced through pipe 6 and taken out through pipe 7. This mixing container is provided with agitating blades or scrapers 8 arranged to tumble the material as well as move it back and forth longitudinally of the container so that when the outlet valve or damper 9 is open, the material will be dropped down through the passageway 10 into a conveying passageway 11 in which a screw conveyor 12 operates, driven by a sprocket 13. The conveyor 12 conveys the material to a vertical passageway 14 from which the sawdust material drops into a treatment container 15. The agitating blades 8 are driven through sprocket wheel 16. After the material with the chemicals with which it is to be treated are mixed in the mixing chamber 4 and discharged therefrom to the treatment container 15, they may then be subjected to chemical treatment in the container 15, halogen acid gas being introduced into the bottom of container 15 through a pipe 17. After the material has been sufficiently treated in the treatment container 15, it is discharged by a suitable screw conveyor 18 operated through a sprocket 19 into a passageway 20 from which it drops into a third container 21. The container 21 is also provided with a jacket 22 for a temperature regulating fluid which may be admitted through pipe 23 and withdrawn through pipe 24. 25 represents a hand operated valve for closing off the connection between the mixing container 4 and treatment container 15 and adapted to form an air-tight seal between the two. A similar hand-operated valve 26 is adapted to close off the connection between the treatment container 15 and the container 21 and form an air-tight seal between the two. Glass covered sight holes are provided at 27 and 28 in order that the operator may know when all of the material in the container 4 has been discharged to the container 15 and all of the material in container 15 has been discharged into the container 21. The manhole 3 is provided with a suitable cover 29 adapted to close the same air-tight and the container 21 is provided with an outlet manhole 30 provided with a closure 31 adapted to close the same air-tight. The container 21 is also provided with agitating blades 32 operated through a sprocket 33ª adapted to tumble the material in the container 21 as well as move it back and forth so that when the closure 31 is open, the material will be fed out through the manhole 30 into suitable conveying apparatus indicated at 33 which carries it upwardly and deposits it in a hopper 34. The containers 4, 15 and 21 are provided with pressure gauges 35, vacuum gauges 36 and thermometers 37 in order that the temperature and pressure in the various containers may be carefully observed.

In starting up the apparatus and using it for the treatment of cellulose as above indicated, the container 4 is filled about two-thirds full of sawdust or the like and a sufficient quantity of dilute hydrochloric acid is mixed therewith in the container 4 to wet the same, but the amount of acid is not sufficient to render fluid any substantial part of the mass. After being thoroughly mixed the material is discharged into the treatment chamber 15 as above described and valves 25 and 26 closed, hydrochloric acid gas is forced up through the material from pipe 17. The hydrochloric acid gas may be introduced from a container 40 in which the gas is stored under pressure and if the pressure is not sufficient the gas may be pumped from the container 40 and into the container 15 by means of a suitable pump 41. The HCl gas is introduced until the strength of acid in the mixture is 39% or more as it is found that the hydrochloric acid of this strength acts to substantially completely convert the cellulose whereas hydrochloric acid of less strength does not do so. After the treatment has been completed in the treatment container 15 the material is discharged into the container 21 as above described, and steam or other heating fluid admitted to the jacket 22 and the blades 32 set in operation in order to drive off HCl gas and hydrochloric acid from the material.

While the material is being treated in the container 15 a fresh batch of sawdust is introduced into the mixing container 4. Pipe connections 42 are provided at each end for connecting the containers 21 and 4, these connections being provided with suitable gas tight shut-off valves at 43 so that when the contents of container 21 are stirred up and heated and hydrochloric gas and hydrochloric acid driven off the valves 43 may be opened and the said gas driven into the fresh batch of sawdust in the container 4. When the system is in operation the three containers 4, 15 and 21 are preferably filled at the same time, the contents of each being moved along to the next lower container at the end of each operation. The upper container 4 having been filled about two-thirds full of sawdust to be treated, previously freed of moisture and the manholes closed and the valves 43 opened, a vacuum pump 44 is started and air withdrawn from the container 4 through pipe 45 and at the same time the agitating blades 8 are set in motion and cold water is allowed to flow through the jacket 5 for the purpose of cooling the contents of the container 4. The suction produced by the pump 44 aids the withdrawal of the HCl gas and hydrochloric acid vapor from the material in container 21 causing it to be drawn into the container 4 and there mixed with the fresh sawdust material. The cooling of the container 4 causes most of the hydrochloric acid vapor and HCl gas to be condensed in the container 4 and mixed with the sawdust therein. During the period that the material remains in the container 4 say about two hours, it becomes thoroughly mixed with the HCl gas and hydrochloric acid, and it is then transferred to the container 15 by opening the valve 25 and by operating the conveyor 12 while the agitator 8 is still in operation. Just before the contents of the container 4 have been thus transferred to the container 15, the fully treated material in container 15 has been discharged into the container 21 as above described and just prior to this the acid feed material in container 21 is discharged into the conveyor 33. When the container 15 has been thus recharged the valves 25 and 26 and 43 are closed and additional HCl gas is forced into the container 15 and up through the material therein from the pipe 17. The HCl gas is allowed to flow into the container 15 until the acid conveyed is built up to a strength of 39% and the pressure increased to from 30 to 60 pounds per square inch while the temperature of the contents rises to from 40 to 50° C.

The material is allowed to stand in the container 15 until the conversion is completed which may be about 2 hours, after which the material is discharged into the container 21 as above described, whereupon the valves 43 are opened and steam admitted to the jacket 22 which results in driving out the HCl gas and later hydrochloric acid vapor which passes up through the pipes 42 and which condenses in the container 4. This evaporation is done at as high a vacuum as can be obtained say 27 to 29 inches so as to keep the temperature as low as possible. The acid having been practically entirely removed from the material in the container 21, the contents are dumped into conveyer 33 as above described which may transfer the dried material directly to fermentation tanks, but preferably deposits it in the hopper 24 from which it is deposited into leaching vessels 46 wherein the glucose is extracted with hot water entering through pipes 47 and removed through pipes 54 and the resulting solution run into the fermentating vessels, the remaining solid residue being dumped into the cars 48.

The container 15 is a vertical cylinder capable of withstanding a pressure up to 60 pounds per square inch. The conveyor 33 may be arranged for receiving the discharge of the series of such systems arranged side by side. Arranged in the pipe 45 is a gas scrubber 49. This may be any form of scrubber for drying unabsorbed HCl gas which may be pulled out of the apparatus along with air which may get into the system particularly with the sawdust, when the pump 44 is in operation, for example, a vertical cylinder or tower packed with tile over which a stream of concentrated sulphuric acid is made to circulate in a manner well understood by those skilled in the art. The vacuum pump 44 discharges the gas through pipe 50 into hydrochloric acid condensing system 51. This may be of any suitable form, for example, a series of tourilles immersed in water containing hydrochloric acid and water. And HCl which is not absorbed in container 4 during the mixing is condensed in the apparatus 51 and any air which may be withdrawn from the container 4 along with said HCl, passes out of the system through the condensing system 51. By provision of these means practically no hydrochloric acid is lost. Connecting pipe 52 is also provided so that HCl gas may be forced directly into the mixing container 4 whenever desired. Sight glasses are also provided at 53 in order that the mixing operation in the container 4 may be observed.

It will be understood that all parts of the apparatus with which HCl gas or hydrochloric acid are likely to come into contact, are of suitable material or suitably treated so as to be unattacked by the acid or acid gas.

From the above it will be seen that after the system has been started up, while the material is being treated in the container 15 a fresh batch is being mixed in the container 4 and the HCl gas and hydrochloric acid is being driven off from the converted material in container 21 and mixed with the fresh raw material in the container 4. By this arrangement the treatment chemicals are used over and over again and the removal thereof from the treated material in container 21 causes them to be forced into the fresh material in container 4. Each of the containers 4, 15 and 21 are emptied between the treatment of batches in container 15, the acid freed material being first discharged from the container 21 into the conveyor 33 and then the treated material in container 15 being discharged into container 21 and then the fresh mixed materials in container 4 being discharged into container 15. Thereafter the valves 25 and 26 are closed and the treatment of the material in container 15 proceeded with while the valves at 43 are opened and the mixing of a fresh charge in container 4 proceeded with simultaneously with the freeing of acid from the material in container 21 and simultaneously with the treatment of the material in container 15.

Each of the containers 4, 15 and 21 are substantially air-tight when closed and the means for discharging the material from container 4 to container 15 and from container 15 to container 21 are likewise substantially air-tight so that the material is moved from one to the other without danger of the escape of any material amount of HCl gas or acid. Likewise the treating materials, to wit the HCl gas and acid are economically conveyed from the container 21 to the fresh raw material in container 4. It will be understood that while the mixing is going on in the container 4 a manhole 3 will be closed of the air-tight cover 29 and that while the HCl gas and acid is being driven from the container 21 the manhole 30 will be closed by the gas tight closure 31. The valves 43 may be closed during the time when the fresh sawdust is being introduced through the manhole 3.

While I have described my improvements in great detail and with respect to a preferred embodiment thereof, I do not desire to be limited to such details or embodiments since in a broader aspect of the invention many changes may be made and the invention embodied in widely differing forms for various treatments. Many other and widely different forms of apparatus may be used for carrying out the invention claimed herein, particularly in its broader aspects.

What I claim as new and desire to secure by Letters Patent, is:

1. The method of converting carbohydrate material which consists in mixing the material in a container sealed to the outside atmosphere, discharging the mixture into a second container without access to the outside atmosphere, converting the material in the second chamber while sealed with respect to the outside atmosphere and to the first container, mixing a fresh batch of material in the first container while the previous batch is being converted in the second container, discharging the converted material into a third container without access to the outside atmosphere, sealing off said third container from the second container, discharging the second batch of material from the first container to the second container without access to the outside atmosphere, sealing off the first container from the second container, mixing a third batch of material in the first container without access to the outside atmosphere, and conveying treatment reagent from the first batch in the third container to the third batch in the first container without access to the outside atmosphere.

2. The method of converting carbohydrate material which consists in mixing the material in a container sealed to the outside atmosphere, discharging the mixture into a second container without access to the outside atmosphere, converting the material in the second chamber while sealed with respect to the outside atmosphere and to the first container, mixing a fresh batch of material in the first container while the previous batch is being converted in the second container, discharging the converted material into a third container without access to the outside atmosphere, sealing off said third container from the second container, discharging the second batch of material from the first container to the second container without access to the outside atmosphere, sealing off the first container from the second container, mixing a third batch of material in the first container without access to the outside atmosphere, and conveying treatment reagent from the first batch in the third container to the third batch in the first container without access to the outside atmosphere, the mixing of the third batch in the first container, the converting of the second batch in the second container and the removal of reagent from the first batch in the third container and transfer thereof to the first container being carried on substantially simultaneously.

3. The method of converting carbohydrate material which consists in mixing the material in a container sealed to the outside atmosphere, discharging the mixture into a second container without access to the outside atmosphere, introducing a converting reagent into the second chamber under pressure and converting the material in the second chamber while sealed with respect to the outside atmosphere and to the first container, mixing a fresh batch of material in the first container, while the previous batch is being converted in the second container, discharging the converted material into a third container without access to the outside atmosphere, sealing off said third container from the second container, discharging the second batch of material from the first container to the second container without access to the outside atmosphere, sealing off the first container from the second container, mixing a third batch of material in the first container without access to the outside atmosphere, and conveying treatment reagent from the first batch in the third container to the third batch in the first container without access to the outside atmosphere.

4. The method of converting carbohydrate material which consists in mixing the material in a container sealed to the outside atmosphere, discharging the mixture into a second container without access to the outside atmosphere, introducing a converting reagent into the second chamber under pressure and converting the material in the second chamber while sealed with respect to the outside atmosphere and to the first container, mixing a fresh batch of material in the first container while the previous batch is being converted in the second container, discharging the converted material into a third container without access to the outside atmosphere, sealing off said third container from the second container, discharging the second batch of material from the first container to the second container without access to the outside atmosphere, sealing off the first container from the second container, mixing a third batch of material in the first container without access to the outside atmosphere, and heating the first batch in the third container to drive off treatment reagent from the first batch in the third container and convey it to the third batch in the first container without access to the outside atmosphere, the mixing of the third batch in the first container, the converting of the second batch in the second container and the removal of reagent from the first batch in the third container and transfer thereof to the first container being carried on substantially simultaneously.

5. In an apparatus of the class described the combination of a plurality of airtight containers, means for mixing material in one container and discharging it into another of said containers without access thereto of the outside atmosphere, means for sealing off said second container from the first whereby the material may be treated in the second container at a pressure different from that in the first container, means for introducing HCl gas into said second container under pressure, means for discharging treated material from said second container into another of said containers without access thereto of the outside atmosphere, means for sealing off said second container from said third container and means for driving off HCl acid gas from the material in said third container and conducting it into said first container to be mixed with a fresh batch of material therein to be treated.

6. In an apparatus of the class described the combination of a plurality of airtight containers, means for mixing material in one container and discharging it into another of said containers without access thereto of the outside atmosphere, means for sealing off said second container from the first whereby the material may be treated in the second container at a pressure different from that in the first container, means for introducing HCl gas into said second container under pressure, means for discharging treated material from said second container into another of said containers without access thereto of the outside atmosphere, means for sealing off said second container from said third container and means for driving off HCl acid gas from the material in said third container and conducting it into said first container to be mixed with a fresh batch of material therein to be treated, and means for applying suction to said first container and withdrawing therefrom HCl acid uncondensed therein and recovering said HCl acid.

7. In an apparatus of the class described the combination of three air-tight containers, the first being adapted to serve as a mixer for material to be treated and treatment material, means for discharging mixed material from the first to the second container without access thereto of the outside atmosphere, means for discharging treated material from the second to the third container without access thereto of the outside atmosphere, means for sealing off each of said containers from the others, and means for conducting treatment material from the third to the first container, said first and third containers having jackets for temperature regulating fluids.

8. The combination of a substantially airtight mixing chamber, an airtight treatment container, and an airtight third container, airtight means for discharging material from the first into the second container and airtight means for discharging material from the second into the third container, means for heating the material in the third container and driving off vapors or gases therefrom, means for conducting said vapors or gases to the first container and means for cooling the first container to condense or collect such vapors or gases therein.

9. The combination of a substantially airtight mixing chamber, an airtight treatment container, and airtight third container, airtight means for discharging material from the first into the second container and airtight means for discharging material from the second into the third container, means for heating the material in said last container and means for introducing gas under pressure into said treatment container, means for cooling the material in said mixing chamber and means for agitating the material in said first and third containers.

10. In an apparatus of the class described the combination of three airtight containers, the first at a higher level than the second, and the second at a higher level than the third, means for discharging material to be treated and treatment agent from the first to the second container, means for discharging treated material from the second to the third container, means for sealing off each of said containers from the others and means for conducting a treatment agent from the third to the first container all without access to the outside atmosphere.

11. In an apparatus of the class described, the combination of a mixing container, a treatment container below the same, and a third container below the treatment container, said containers having inlets and outlets, the outlet of the mixing container being out of alignment with the inlet of the treatment container, and the outlet of the treatment container being out of alignment with the inlet of the third container, means for continuously conveying the material which drops from said mixing container outlet to the inlet of said treatment container without access to the outside atmosphere, means for continuously conveying the material which drops from said treatment container outlet to said third container inlet without access to the outside atmosphere, means for sealing off each of said containers from the others, and means for conveying treatment material from the third container to the first container without access to the outside atmosphere.

12. The method of treating cellulose material which consists in mixing the same with HCl acid in one container without access to the outside atmosphere, transferring the mixture to a second container without access to the outside atmosphere, introducing HCl gas under pressure to material in the second container, and converting the material without access to the outside atmosphere, transferring the converted material from the second container to a third container without access to the outside atmosphere, heating the material in the third container and conveying the HCl driven off therefrom to the first container to treat a fresh batch of material therein.

13. The process of converting cellulose which consists in conveying the cellulose through a mixing chamber subjected to the action of cooling means, simultaneously mixing with said cellulose while being conveyed through said chamber liquid hydrochloric acid, conveying the mixed cellulose and acid to a conversion chamber without access to the outside atmosphere, digesting the cellulose with the acid in said conversion chamber, while subjecting the same to hydrochloric acid gas under pressure, and removing the hydrochloric acid from the digested cellulose.

14. The process of converting cellulose which consists in mixing the cellulose with HCl acid in one container and while cooling the same, transferring the mixture to a second container without access to the outside atmosphere, introducing HCl gas under pressure to the mixture in the second container and digesting the cellulose with the acid therein without access to the outside atmosphere, and removing the hydrochloric acid from the digested cellulose.

15. The process of converting cellulose which consists in mixing the cellulose with HCl and digesting the cellulose therewith in a container without access to the outside atmosphere, while maintaining the strength of the acid in the mixture at about 39% or above, transferring the digested cellulose to another container without access to the outside atmosphere and removing the HCl therefrom and treating fresh cellulose therewith.

16. The process of converting cellulose which consists in mixing the cellulose with HCl and digesting the cellulose in a container closed to the outside atmosphere while maintaining the strength of the acid at about 39% or more, then transferring the digested cellulose to another container without access to the outside atmosphere and removing HCl from the cellulose therein and treating fresh cellulose with the recovered HCl.

Signed at Ann Arbor, in the county of Washtenaw and State of Michigan, this 28th day of Jan., A. D. 1920.

RUDOLPH ALFRED KOCHER.